(12) United States Patent
Huang et al.

(10) Patent No.: US 10,824,891 B2
(45) Date of Patent: Nov. 3, 2020

(54) RECOGNIZING BIOLOGICAL FEATURE

(71) Applicant: Beijing Xiaomi Mobile Software Co., Ltd., Beijing (CN)

(72) Inventors: Xuebin Huang, Beijing (CN); Chuanshun Ji, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 238 days.

(21) Appl. No.: 15/990,373

(22) Filed: May 25, 2018

(65) Prior Publication Data

US 2018/0341824 A1 Nov. 29, 2018

(30) Foreign Application Priority Data

May 26, 2017 (CN) .......................... 2017 1 0385588

(51) Int. Cl.
G06K 9/03 (2006.01)
G06K 9/00 (2006.01)
G06F 21/32 (2013.01)
G10L 17/22 (2013.01)

(52) U.S. Cl.
CPC .............. *G06K 9/03* (2013.01); *G06F 21/32* (2013.01); *G06K 9/00087* (2013.01); *G06K 9/00288* (2013.01); *G06K 9/00885* (2013.01); *G06K 9/00617* (2013.01); *G10L 17/22* (2013.01)

(58) Field of Classification Search
None
See application file for complete search history.

(56) References Cited

U.S. PATENT DOCUMENTS

| 2014/0282945 A1* | 9/2014 | Smith | G06F 21/78 726/6 |
| 2015/0349959 A1* | 12/2015 | Marciniak | H04L 9/3231 713/186 |
| 2018/0253583 A1* | 9/2018 | Nogueyra | G06K 9/001 |

FOREIGN PATENT DOCUMENTS

| CN | 105488372 A | 4/2016 |
| CN | 105631285 A | 6/2016 |
| CN | 105868611 A | 8/2016 |
| CN | 105868613 A | 8/2016 |

(Continued)

OTHER PUBLICATIONS

European Search Report in corresponding European Patent Application No. 18174046.5, dated Sep. 28, 2018 (26 pages).

(Continued)

*Primary Examiner* — Kevin Ky
(74) *Attorney, Agent, or Firm* — Arch & Lake LLP

(57) ABSTRACT

A method of recognizing a biological feature is provided. In an example, the method includes: first biological feature data is obtained; a first recognition operation is performed according to the first biological feature data and biological feature template data to obtain a first recognition result; when the first recognition result indicates a match failure, second biological feature data is obtained; and a re-recognition operation is performed according to the second biological feature data and the biological feature template data to obtain a second recognition result. The second biological feature data and the first biological feature data are collected by a same biological feature collector at different moments in a same biological feature recognition process.

17 Claims, 3 Drawing Sheets

(56) References Cited

FOREIGN PATENT DOCUMENTS

EP          1148446  A2    10/2001

OTHER PUBLICATIONS

Jain et al., "An Introduction to Biometric Recognition", IEEE Transactions on Circuits and Systems for Video Technology, Institute of Electrical and Electronics Engineers, US, vol. 14, No. 1, Jan. 2004, XP011105912 (17 pages).
First Office Action (including English translation) and Search Report Issued in corresponding Chinese Application No. 201710385588.0, dated Mar. 27, 2019, 15 pages.
EP Office Action issued to European Patent Application No. 18174046.5 dated Mar. 4, 2020, (4p).

* cited by examiner

RECOGNIZING BIOLOGICAL FEATURE

CROSS REFERENCE TO RELATED APPLICATIONS

This application claims priority to Chinese Patent Application No. 201710385588.0 filed on May 26, 2017, the entire content of which is incorporated herein by reference for all purposes.

TECHNICAL FIELD

The present disclosure relates to electronic device technology, and in particularly, relates to recognizing a biological feature in the field of the electronic device technology.

BACKGROUND

With the development of the electronic device technology, electronic devices are increasingly used and have become one of the most important tools in people's daily work and lives. To secure user information on the electronic device, a biological feature recognition function may be provided in the electronic device when the electronic device is in use. An identity of the user may be authenticated when operations with high security requirements such as unlocking or payment operations are performed on the electronic device.

For example, a biological feature may be a fingerprint. When a user touches or presses a fingerprint button, a fingerprint recognizing module may obtain fingerprint data collected by a fingerprint sensor, and may obtain a recognition result by performing fingerprint recognition according to the fingerprint data and pre-stored fingerprint template data. An unlocking module or a payment module may be notified with the recognition result. The unlocking module can determine whether to perform an unlocking operation according to the recognition result. The payment module can also determine whether to perform a payment operation according to the recognition result.

SUMMARY

Based on this, the present disclosure provides a method of recognizing a biological feature, an electronic device, and a machine-readable storage medium.

According to a first aspect, there is provided a method of recognizing a biological feature. The method may include: obtaining first biological feature data; performing a first recognition operation according to the first biological feature data and biological feature template data to obtain a first recognition result; and when the first recognition result indicates a match failure: obtaining second biological feature data; and performing a re-recognition operation according to the second biological feature data and the biological feature template data to obtain a second recognition result, where the second biological feature data and the first biological feature data are collected by a same biological feature collector at different moments in a same biological feature recognition process.

According to a second aspect, there is provided an electronic device, including a processor, and a non-transitory machine-readable storage medium configured to store machine-executable instructions, where, by reading and executing the machine-executable instructions, the processor may be caused to: obtain first biological feature data; perform a first recognition operation according to the first biological feature data and biological feature template data to obtain a first recognition result; and when the first recognition result indicates a match failure: obtain second biological feature data; and perform a re-recognition operation according to the second biological feature data and the biological feature template data to obtain a second recognition result, where the second biological feature data and the first biological feature data are collected by a same biological feature collector at different moments in a same biological feature recognition process.

According to a third aspect, there is provided a non-transitory machine-readable storage medium storing machine-executable instructions executed by one or more processors, the machine-executable instructions when executed may cause the one or more processors to perform: obtaining first biological feature data; performing a first recognition operation according to the first biological feature data and biological feature template data to obtain a first recognition result; and when the first recognition result indicates a match failure: obtaining second biological feature data; and performing a re-recognition operation according to the second biological feature data and the biological feature template data to obtain a second recognition result, where the second biological feature data and the first biological feature data are collected by a same biological feature collector at different moments in a same biological feature recognition process.

It shall be appreciated that the above general descriptions and the following detailed descriptions are merely illustrative and explanatory and cannot limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
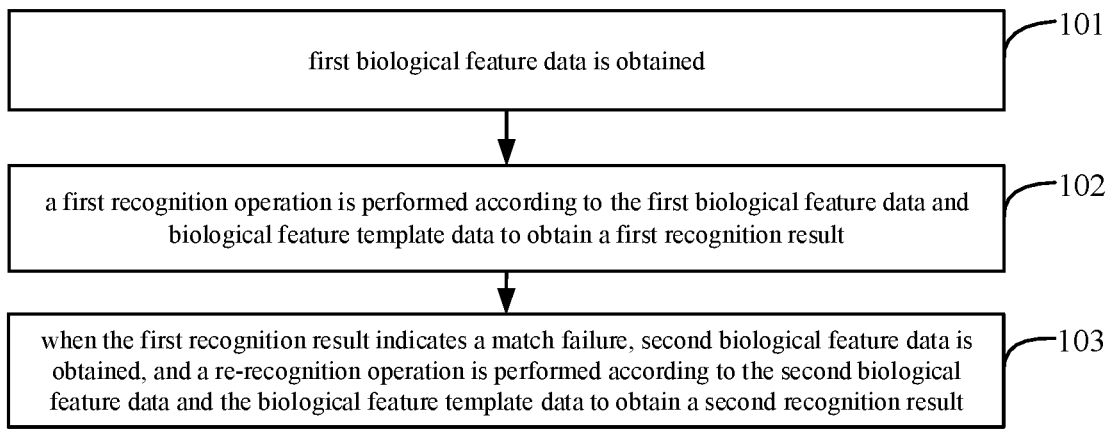
FIG. 1 is a flowchart illustrating a method of recognizing a biological feature according to an example of the present disclosure.

Illustrative examples will be described in detail here with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present disclosure described in detail in the appended claims.

The terms used in the present disclosure is for the purpose of describing a particular example only, and is not intended to limit the present disclosure. The singular forms such as "a", 'said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, etc. in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "in response to determining".

To secure user information on an electronic device, a biological feature recognition function may be provided in the electronic device when the electronic device is in use. In this way, when operations with high security requirements such as unlocking or paying are performed on the electronic device, the identity of the user can be authenticated.

Taking a biological feature as a fingerprint for example, a fingerprint recognition program may expose an interface, so that the fingerprint recognition program can be invoked by an invoking program, such as an unlocking program and/or a paying program via the interface. For example, the fingerprint recognition program may be invoked by a binder mechanism. Then, the fingerprint recognition program may notify the invoking program of the recognition result. In an example, when invoked, the fingerprint recognition program may obtain a recognition result by performing a fingerprint recognition operation according to the match of fingerprint data collected by a fingerprint sensor and pre-stored fingerprint template data, and then directly notify the invoking program of the recognition result.

In an example, only one recognition operation is performed in each touch process, so that the recognition result may be notified to the invoking program. However, there may be a case that a recognition result indicating a match failure still outputs even though a user lightly touches or presses a fingerprint button with a correct finger. Since the unlocking program is often set with a maximum number of errors, the electronic device will be locked if the preset maximum number of errors is reached, thereby affecting customer experience.

To avoid a case that a recognition result indicating a match failure still outputs even though a correct biological feature is used for recognition, the present disclosure provides a method of recognizing a biological feature. FIG. 1 is a flowchart illustrating a method of recognizing a biological feature according to an example of the present disclosure. The method may be applied to an electronic device and may include the following blocks.

At block 101, first biological feature data is obtained.

At block 102, a first recognition operation is performed according to the first biological feature data and biological feature template data to obtain a first recognition result.

At block 103, if the first recognition result indicates a match failure, second biological feature data is obtained, and a re-recognition operation is performed according to the second biological feature data and the biological feature template data to obtain a second recognition result, where the second biological feature data and the first biological feature data are collected by a same biological feature collector at different moments in a same biological feature recognition process.

It is noted that the second biological feature data obtained in each of the re-recognition operations is different and the same biological feature recognition process is a process from recognition start to output of the second recognition result.

In an example, the method of recognizing a biological feature further includes: outputting the second recognition result in a case that the second recognition result indicates a successful match or a number of the re-recognition operations reaches a preset upper limit; and continuing obtaining new second biological feature data and performing the re-recognition operation in a case that the second recognition result indicates a match failure and the number of the re-recognition operations is less than the upper limit.

In an example of the present disclosure, the electronic device may include a mobile terminal having a biological feature recognition function, such as a smart phone, a tablet computer, a Personal Digital Assistant (PDA), an e-book reader, and the like, and may also include a device having the biological feature recognition function such as, a television, a multimedia player, an image capturing device, a smart household device, and the like. The electronic device may be provided with a biological feature collector (such as, a sensor) for collecting biological feature data.

The biological feature data may include fingerprint data, human face data, iris data, voice data, or the like. The method of recognizing a biological feature in the present disclosure may include two stages: one being a template inputting stage and the other being a feature recognition stage. In the template inputting stage, biological feature data of a user may be collected repeatedly by the biological feature collector, so that biological feature template data for describing the biological feature of the user can be constructed and then stored in a database.

In the feature recognition stage, the biological feature data may be collected by the biological feature collector when a biological feature recognizing module is started. In an example, the biological feature data collected for the first time is called first biological feature data.

In an example, obtaining the first biological feature data includes: obtaining the first biological feature data by the biological feature collector when it is determined that a biological feature recognition operation is triggered and a number of operations for outputting a recognition result indicating a match failure is less than a preset maximum number of errors.

In a practical application, a recognition process may fail due to an incorrect recognized object or other reasons. In an example, to avoid waste of resources due to repeated recognitions, an allowable maximum number of operations for outputting a recognition result indicating a match failure may be set, and it means a maximum number of errors may be set. The maximum number of errors may be configured flexibly, for example, configured to be 5. Thus, the first biological feature data may be obtained by the biological feature collector when it is determined that a biological feature recognition operation is triggered and the number of operations for outputting a recognition result indicating a match failure is less than the preset maximum number of errors. If the number of operations for outputting a recognition result indicating a match failure reaches the preset maximum number of errors, the first biological feature data may be no longer obtained and the biological feature recognition operation may be stopped. Taking unlocking for example, when the number of operations for outputting a recognition result indicating a match failure reaches the preset maximum number of errors, the biological feature recognition cannot be used for unlocking in a preset time period, but unlocking may be achieved by a password or the like.

After the first biological feature data is obtained, the biological feature recognition operation can be performed according to the first biological feature data and the pre-stored biological feature template data. One of recognition methods will be illustrated below.

In an example, the first biological feature data is processed correspondingly and then matched with the biological feature template data. For example, the corresponding processing method may include pre-processing, feature extracting and the like. Taking the biological feature as a fingerprint for example, the pre-processing process includes determining image quality, enhancing an image, detecting a fingerprint region, estimating a fingerprint orientation map, estimating frequency, performing image binarization, performing image thinning, and the like. Features of the fingerprint may include a fingerprint morphology feature and a minutiae feature. The fingerprint morphology feature may include a core point, a delta point, and the like. The minutiae feature may include starting points, ending points, joining points and forking points of the fingerprint lines, etc. The corresponding processing for the biological feature may be any processing process that a person skilled in the art is well known, which will not be redundantly described here one by one.

It is determined whether the processed data and the biological feature template data are from a same biological feature source by comparing them. In this way, a user identity can be authenticated. In an example, it is determined whether the processed data is matched with the biological feature template data by setting a similarity threshold, so as to obtain a matching result, such as a first recognition result. For example, rough matching is first performed according to a pattern of the fingerprint and then exact matching is performed according to the fingerprint morphology feature and the minutiae feature, thereby obtaining a similarity score between the processed data and the biological feature template data. When the similarity score is greater than or equal to the similarity threshold, a successful match may be determined. When the similarity score is less than the similarity threshold, a match failure may be determined. It will be understood that other processes may also be used to determine whether the processed data is matched with the biological feature template data, which will not be redundantly described here one by one.

In a same biological feature recognition process, the biological feature data collected at different moments may be different due to influence of a plurality of factors, such as touch degree, light or environmental noise. Taking fingerprint recognition for example, in a same touch process, contact areas between a finger of a user and a fingerprint button may be different at different moments, thus generating a case that fingerprint data collected by a fingerprint sensor at different moments may be different. Taking human face recognition for example, in a same human face recognition process, human face data collected by a human face data collecting device at different moments may be different due to influence of light or other environmental factors. Taking voice recognition for example, in a same voice recognition process, environmental noises at different moments may be different, thus generating a case that voice data collected by a voice collector at different moments may be different.

Based on this, if the first recognition operation is performed with the first biological feature data collected for the first time and the first recognition result indicates a match failure, second biological feature data may be obtained and a re-recognition operation may be performed according to the second biological feature data and the biological feature template data to obtain a second recognition result, where the second biological feature data and the first biological feature data are collected by a same biological feature collector at different moments in a same biological feature recognition process.

The re-recognition operation is a biological feature recognition operation which is performed with the second biological feature data collected at different moments in a same biological feature recognition process. A process from recognition start to output of the second recognition result may be called a same recognition process. An upper limit indicating that the maximum number of the re-recognition operation can be performed may be preset. That is, the times that the re-recognition operation can be performed at most are the upper limit. For example, the preset upper limit is one or more than one. The re-recognition operation may be performed on a condition that the second recognition result of previous re-recognition operation indicates a match failure and the number of the re-recognition operations is less than the upper limit. The second biological feature data obtained in each of the re-recognition operations are collected at different moments in the same biological feature recognition process.

In an example, taking consideration of an outputting speed of the second recognition result, the upper limit can be preset to one. In this case, the second recognition result obtained in the re-recognition operation will be output no matter what the second recognition result of the re-recognition operation is.

It can be seen that by setting the upper-limit to one, a case that the recognition result indicating a match failure is output when a correct biological feature is used for recognition can be substantially avoided, and the outputting speed of the recognition result will not be dropped too much.

In an example, the second biological feature data is collected when it is determined that a recognition result indicates a match failure. The recognition result may include the first recognition result and the second recognition result.

In this example, the second biological feature data for the re-recognition operation may be collected when the first recognition result indicating a match failure is obtained or the second recognition result indicating a match failure is obtained.

Taking the upper-limit as 3 for example, the first biological feature recognition operation is performed according to the first biological feature data and the biological feature template data. If the first recognition result indicating a match failure is obtained, second biological feature data is collected when the first recognition result indicating the match failure is obtained, and then a first biological feature re-recognition operation is performed according to the second biological feature data and the biological feature template data to obtain a first re-recognition result. If the first re-recognition result indicating a match failure is obtained, the new second biological feature data is collected when the first re-recognition result indicating the match failure is obtained, and then a second biological feature re-recognition operation is performed according to the new second biological feature data and the biological feature template data to obtain a second re-recognition result. If the second re-recognition result indicating a match failure is obtained, the another new second biological feature data is collected when the second re-recognition result indicating the match failure is obtained is collected, and then a third biological feature re-recognition operation is performed according to the another new second biological feature data and the biological feature template data to obtain a third re-recognition result. Then, the third re-recognition result is output.

Taking the upper-limit as 3 for example, the first biological feature recognition operation is performed according to the first biological feature data and the biological feature template data. If the first recognition result indicating a match failure is obtained, second biological feature data is collected when the first recognition result indicating the match failure is obtained, and then a first biological feature re-recognition operation is performed according to the second biological feature data and the biological feature template data to obtain a first re-recognition result. If the first re-recognition result indicating a match failure is obtained, the new second biological feature data is collected when the first re-recognition result indicating the match failure is obtained, and then a second biological feature re-recognition operation is performed according to the new second biological feature data and the biological feature template data to obtain a second re-recognition result. If the second re-recognition result indicating a successful match is obtained, the second re-recognition result is output and a third biological feature re-recognition operation can be not performed.

As can be seen from the above examples, the biological feature data of the current moment can be collected only when a recognition result indicating a match failure is obtained, thereby avoiding wasting resources due to real-time collection.

In another example, a sampling frequency is determined based on a time length for each of the re-recognition operations, and the second biological feature data is collected at the sampling frequency in a same biological feature recognition process. For example, in a same biological feature recognition process, the biological feature data may be collected at the sampling frequency as the first biological feature data and the second biological feature data. A time interval between two collections, i.e., a sampling frequency, may be determined based on a time length for one re-recognition operation in a historical record, so that the collection time of the second biological feature data is earlier than or same to the starting time of the re-recognition operation. Thus, in an example, the number of operations for collecting the biological feature data may be more than the number of operations for performing the re-recognition operation by at least one.

In an example, in a same biological feature recognition process, biological feature data is collected at the sampling frequency. The biological feature data collected at the first time may be taken as the first biological feature data. The biological feature data collected at the second time may be taken as the second biological feature data for the first re-recognition operation. The biological feature data collected at the third time may be taken as the new second biological feature data for the second re-recognition operation, and so forth.

As can be seen from the above examples, the biological feature data for each of the re-recognition operations is biological feature data which has been collected already. It means that the determination of performing the re-recognition operation will start a recognition operation directly on prepared biological feature data without triggering a collection of biological feature data, thereby effectively improving the efficiency of each of the re-recognition operations.

In an example, if the first recognition result indicates a successful match, the first recognition result is directly output.

Regardless of the first recognition result indicating a successful match obtained by performing the first biological feature recognition operation or the second recognition result indicating a successful match obtained by performing the re-recognition operation, the recognition result indicating a successful match may be directly output.

In an example, the first biological feature data and the second biological feature data are fingerprint data. Outputting the second recognition result may include: notifying an unlocking module of the second recognition result such that the unlocking module determines whether to perform an unlocking operation according to the second recognition result; or notifying a paying module of the second recognition result such that the paying module determines whether to perform a paying operation according to the second recognition result. In other words, outputting the second recognition result may include: notifying a module for triggering the biological feature recognition operations of the second recognition result, where the module for triggering the biological feature recognition operations may include the unlocking module and the paying module.

The method of recognizing a biological feature in the present disclosure may be applied to a fingerprint recognizing module. The fingerprint recognizing module may be associated with the unlocking module or the paying module by using a client-server communication structure. The fingerprint recognizing module may serve as a server, an invoking program such as the unlocking module or the paying module may serve as a client, and the fingerprint recognizing module may notify the client of the recognition result.

As can be seen from the above examples, the method of recognizing a biological feature provided by the present disclosure may be applied to a scenario of unlocking or payment, so as to increase a success rate of unlocking or payment and to avoid locking an electronic device or failing to pay due to a plurality of fingerprint recognition failures.

The technical features in the above examples may be combined in any way as long as the combinations of features have no conflict or contradiction with each other, which is not described one by one due to limited page space. Therefore, any combinations of the technical features in the above examples can be encompassed in the scope of the disclosure of this description.

Figure 2:
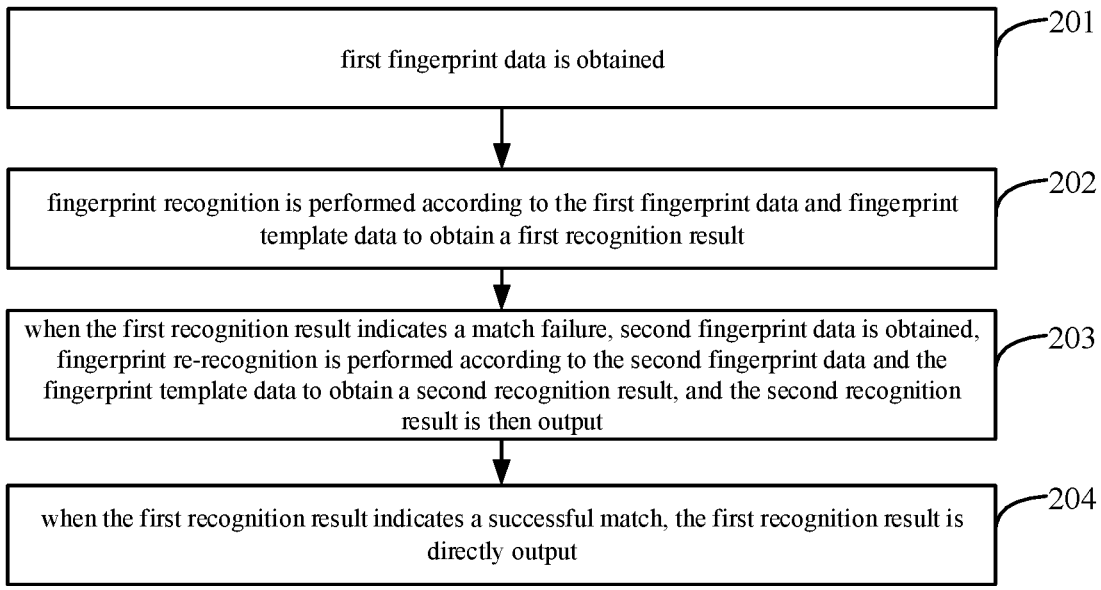
FIG. 2 is a flowchart illustrating a method of recognizing a biological feature according to another example of the present disclosure.

FIG. 2 is a flowchart illustrating a method of recognizing fingerprint according to another example of the present disclosure. The method may be applied to a fingerprint recognizing module of an electronic device and include the following blocks.

At block 201, first fingerprint data is obtained.

The fingerprint recognizing module may be invoked by an unlocking module and may then instruct a fingerprint sensor to be in a recognition state and wait for a user to contact the fingerprint sensor with a finger. When the user lightly touches or presses a fingerprint button, the fingerprint sensor starts collecting fingerprint data, and the fingerprint recognizing module may obtain the fingerprint data collected by the fingerprint sensor.

At block 202, fingerprint recognition is performed according to the first fingerprint data and fingerprint template data to obtain a first recognition result.

The method of recognizing fingerprint may be any technique that a person skilled in the art is well known, which will not be redundantly described here one by one.

At block 203, if the first recognition result indicates a match failure, second fingerprint data is obtained; then, fingerprint re-recognition is performed according to the second fingerprint data and the fingerprint template data to obtain a second recognition result, and the second recognition result is then output. The second fingerprint data and the first fingerprint data are collected at different moments in a same touch process.

At block 204, if the first recognition result indicates a successful match, the first recognition result is directly output.

When the first recognition result indicates a successful match, the fingerprint recognizing module may notify the unlocking module of the first recognition result, so that the unlocking module can determine whether to unlock according to the first recognition result. When the first recognition result indicates a match failure, the fingerprint recognizing module may notify the unlocking module of the second recognition result, so that the unlocking module can determine whether to unlock according to the second recognition result. The unlocking module may also be set with a maximum number of errors, for example, the maximum number of errors may be set to 5. If the second recognition results in five touch processes all indicate a match failure, the electronic device may be locked and the fingerprint recognition process may be stopped. Thus, the electronic device may be unlocked with a password, or the fingerprint recognition process can be restarted after a specified time interval.

As can be seen from the above examples, in a same touch process, if the first recognition result indicating a match failure is obtained by performing the first fingerprint recognition operation with the fingerprint data collected at the first time, the fingerprint re-recognition operation is performed with the fingerprint data collected at the second time to obtain a second recognition result and the second recognition result is output. If the first recognition result indicates a successful match, the first recognition result is directly output without performing the fingerprint re-recognition operation. Thus, a case that the recognition result indicating a match failure is output when a correct biological feature is used for recognition can be substantially avoided, thereby effectively increasing the recognition efficiency.

Corresponding to the method of recognizing a biological feature as described above, the present disclosure also provides examples of an apparatus for recognizing a biological feature, an electronic device, and a storage medium thereof.

Figure 3:
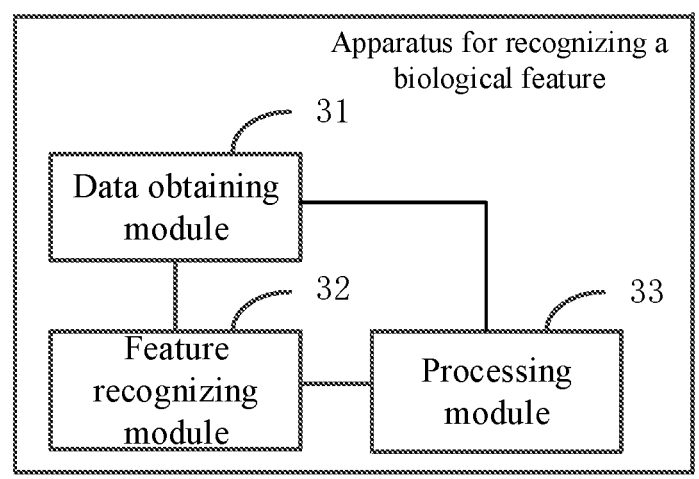
FIG. 3 is a diagram illustrating a functional module of an apparatus for recognizing a biological feature according to an example of the present disclosure.

FIG. 3 is a diagram illustrating a functional module of an apparatus for recognizing a biological feature according to an example of the present disclosure. The apparatus may include: a data obtaining module 31, a feature recognizing module 32, and a processing module 33.

The data obtaining module 31 is configured to obtain first biological feature data.

The feature recognizing module 32 is configured to perform a first recognition operation according to the first biological feature data and biological feature template data to obtain a first recognition result.

The processing module 33 is configured to when the first recognition result indicates a match failure, obtain second biological feature data and perform a re-recognition operation according to the second biological feature data and the biological feature template data to obtain a second recognition result, where the second biological feature data and the first biological feature data are collected by a same biological feature collector at different moments in a same biological feature recognition process. In an example, the processing module 33 is further configured to when the second recognition result indicates a match failure and the number of the re-recognition operations is less than the preset upper limit, continue obtaining new second biological feature data and performing the re-recognition operation.

Sometimes, when a first recognition result indicates a match failure, a second biological feature data may be obtained, and the second biological feature data may be of different type of the first biological feature data. For example, the first biological feature data may be fingerprint and the second biological feature data may be voice recognition. As such, the one or more re-recognition operation may be different from the first recognition operation that takes place initially. When this happens, there may be different the biological feature collectors to collect the first biological feature data and the biological feature data used in the one or more re-recognition operation. When the number of re-recognition operations is more than one, re-recognition operations may also be different among themselves.

The apparatus for recognizing a biological feature may further include an outputting module configured to output the second recognition result in the case that the second recognition result indicates a successful match or a number of the re-recognition operations reaches a preset upper limit.

When determining that the re-recognition operation is to be performed, the processing module 33 may notify the data obtaining module 31 of obtaining the second biological feature data and notify the feature recognizing module 32 of performing the biological feature recognition according to the second biological feature data and the biological feature template data.

As can be seen from the above examples, in a process from recognition start to output of the second recognition result, if the first recognition result indicating a match failure is obtained by performing fingerprint recognition with the first fingerprint data, the re-recognition operation is performed and the second recognition result obtained by the re-recognition operation is output. Thus, a case that the recognition result indicating a match failure is output when a correct biological feature is used for recognition can be substantially avoided, thereby increasing the recognition efficiency.

In an example, the preset upper limit is set to one.

As can be seen from the above examples, by setting the upper-limit to one, a case that the recognition result indicating a match failure is output when a correct biological feature is used for recognition can be substantially avoided, and the outputting speed of the recognition result will not be dropped too much.

In an example, the data obtaining module 31 is configured to obtain the first biological feature data by the biological feature collector when it is determined that a biological feature recognition operation is triggered and a number of operations for outputting a recognition result indicating a match failure is less than a preset maximum number of errors. Thus, waste of power due to repeated recognition operations can be avoided.

In an example, the processing module 33 is further configured to collect the second biological feature data by the biological feature collector when it is determined that a recognition result indicates a match failure, wherein the recognition result comprises the first recognition result and the second recognition result.

As can be seen from the above examples, the biological feature data of the current moment can be collected only when a recognition result indicating a match failure is obtained, thereby avoiding wasting resources due to real-time collection.

In an example, the apparatus for recognizing a biological feature may be configured to: determine a sampling frequency based on a time length for each of the re-recognition operations; and collect biological feature data as the first biological feature data and the second biological feature data at the sampling frequency by the biological feature collector in the same biological feature recognition process.

As can be seen from the above examples, the biological feature data for each of the re-recognition operations is biological feature data which has been collected already. It means that the determination of performing the re-recognition operation will start a recognition operation directly on prepared biological feature data without triggering a collection of biological feature data, thereby effectively improving the efficiency of each of the re-recognition operation.

In an example, the processing module 33 is further configured to directly output the first recognition result when the first recognition result indicates a successful match.

As can be seen from the above examples, if the first recognition result indicates a successful match, the first recognition result is directly output without performing the re-recognition operation, thereby avoiding a case that the recognition efficiency is reduced due to the re-recognition operation.

In an example, the biological feature data may include one of fingerprint data, human face data, iris data, and voice data.

In an example, the outputting module is configured to notify a module for triggering the biological feature recognition operations of the second recognition result, where the module for triggering the biological feature recognition operations comprises an unlocking module and a paying module.

As can be seen from the above examples, the apparatus for recognizing a biological feature in the present disclosure can be applied to a scenario of unlocking or paying, so as to increase the success rate of unlocking or payment and to avoid locking an electronic device or failing to pay due to a plurality of fingerprint recognition failures.

The present disclosure further provides an electronic device. The electronic device may include a processor, and a machine-readable storage medium configured to store machine-executable instructions, where the processor may execute the method of recognizing a biological feature as described above by reading and executing the machine-executable instructions.

The present disclosure further provides a non-transitory machine-readable storage medium storing machine-executable instructions executed by one or more processors, the machine-executable instructions cause the one or more processors to perform the above method of recognizing a biological feature.

The machine-readable storage medium in the present disclosure may include but not limited to a magnetic disk memory, a CD-ROM, an optical memory, etc. The machine-readable storage medium may include permanent and non-permanent, removable and non-removable media, and can realize information storage by any method or technique. The information may be computer-readable instructions, a data structure, a module of a program or other data. Examples of the machine-readable medium may include but are not limited to: Phase Change Random Access Memory (PRAM), Static Random Access Memory (SRAM), Dynamic Random Access Memory (DRAM), other types of Random Access Memories (RAMs), Read-Only Memory (ROM), Electrically Erasable Programmable Read-Only Memory (EEPROM), Flash Memory or other memory techniques, Compact Disk Read-Only Memory (CD-ROM), Digital Versatile Disk (DVD) or other optical storages, magnetic cassette tape, magnetic tape magnetic/disk storage or other magnetic storage devices or any other non-transmission media that can be used to store information accessible to a computing device.

Details of the implementation process of the functions and effects of different modules in the above-described apparatus may be seen from the implementation process of corresponding blocks in the above-described method, which will not be redundantly described here.

Since the apparatus examples substantially correspond to the method example, a reference may be made to part of the descriptions of the method examples for the related part. The apparatus examples described above are merely illustrative, where the modules described as separate members may be or not be physically separated, and the members displayed as modules may be or not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry out those without creative work.

Figure 4:
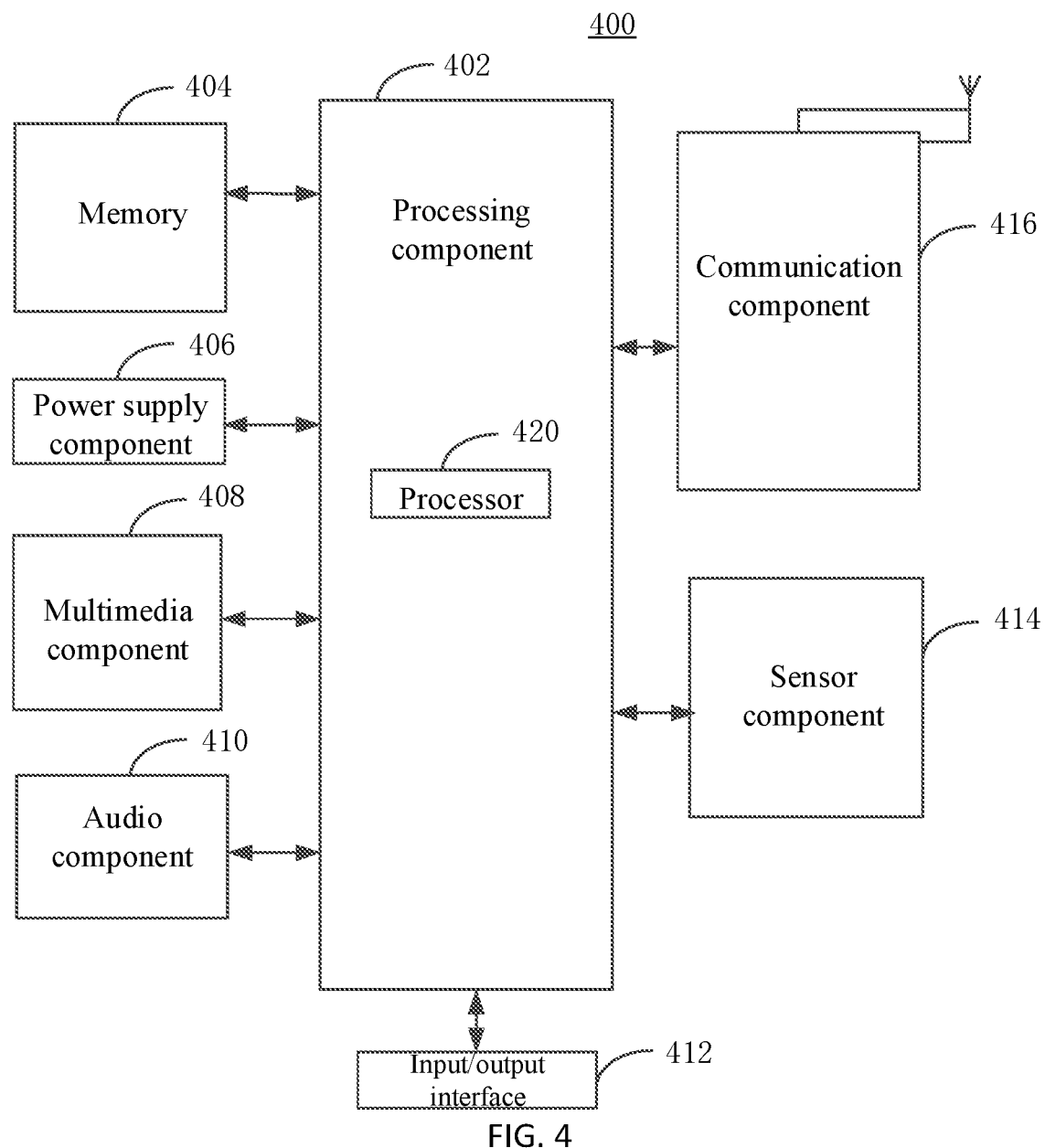
FIG. 4 is a diagram illustrating a hardware structure of an electronic device for recognizing a biological feature according to an example of the present disclosure.

FIG. 4 is a diagram illustrating a hardware structure of an electronic device for recognizing a biological feature according to an example of the present disclosure. The electronic device 400 may be a terminal having a biological feature recognition function, such as a mobile phone, a computer, a digital broadcasting terminal, a message transceiver, a game console, a tablet device, a medical device, a fitness facility, and a personal digital assistant.

With reference to FIG. 4, the electronic device 400 may include one or more of: a processing component 402, a memory 404, a power supply component 406, a multimedia component 408, an audio component 410, an Input/Output (I/O) interface 412, a sensor component 414, and a communication component 416.

The processing component 402 generally controls the overall operations of the electronic device 400, such as operations associated with display, calling, data communication, camera operation and recording operation. The processing component 402 may include one or more processors 420 for executing instructions to complete all or part of blocks of the above-described method. Besides, the processing component 402 may include one or more modules to facilitate interactions between the processing component 402 and other components. For example, the processing component 402 may include a multimedia module to facilitate the interaction between the multimedia component 408 and the processing component 402.

The memory 404 is configured to store different types of data to support the operations of the electronic device 400. Examples of such data include instructions of any application program or method operable on the electronic device 400, contact data, telephone directory data, messages, pictures, videos, and the like. The memory 404 may be implemented by any type of volatile or non-volatile storage device or a combination thereof, such as a Static Random Access Memory (SRAM), an Electrically Erasable Programmable Read-Only Memory (EEPROM), an Electrically Programmable Read-Only-Memory (EPROM), a Programmable Read-Only-Memory (PROM), a Read-Only Memory (ROM), a magnetic memory, a flash memory, a magnetic disk or an optical disk.

The power supply component 406 provides power for different components of the electronic device 400. The power supply component 406 may include a power management system, one or more power sources, and other components associated with generating, managing and distributing power for the electronic device 400.

The multimedia component 408 may include a screen for providing an output interface between the device 400 and a user. In some examples, the screen may include a Liquid Crystal Display (LCD) and/or a Touch Panel (TP). If the screen includes a touch panel, the screen may be implemented as a touch screen to receive input information from a user. The touch panel may include one or more touch sensors to sense touch, slide and gestures on the touch panel. The touch sensor may not only sense the boundary of a touch or slide motion but also detect duration and pressure related to the touch or slide operation. In some examples, the multimedia component 408 includes a front-facing camera and/or a rear camera. When the electronic device 400 is in an operating mode, such as a shooting mode or a video mode, the front-facing camera and/or the rear camera may receive external multimedia data. Each of the front-facing camera and the rear camera may be a fixed optical lens system or be capable of focal length and optical zoom.

The audio component 410 is configured to output and/or input an audio signal. For example, the audio component 410 may include a microphone (MIC). When the electronic device 400 is in an operating mode, such as a call mode, a recording mode and a speech recognition mode, the microphone is configured to receive an external audio signal. The received audio signal may be further stored in the memory 404 or transmitted via the communication component 416. In some examples, the audio component 410 may also include a speaker for outputting an audio signal.

The I/O interface 412 provides an interface between the processing component 402 and a peripheral interface module. The peripheral interface module may be a keyboard, a click wheel, a button and the like. Such buttons may include but not limited to: a home button, a volume button, a start button and a lock button.

The sensor component 414 may include one or more sensors for providing state assessments in different aspects for the device 400. For example, the sensor component 414 may detect the on/off state of the electronic device 400, and relative locations of components, such as a display and a small keyboard of the electronic device 400. The sensor component 414 may also detect a position change of the electronic device 400 or a component of the device electronic 400, the presence or absence of contact of a user with the electronic device 400, an orientation or acceleration/deceleration of the electronic device 400 and a temperature change of the electronic device 400. The sensor component 414 may include a proximity sensor configured to detect a nearby object without any physical contact. The sensor component 414 may also include an optical sensor, such as a CMOS or CCD image sensor for being used in imaging application. In some examples, the sensor component 414 may also include an acceleration sensor, a gyroscope sensor, a magnetic sensor, a pressure sensor, or a temperature sensor.

The communication component 416 is configured to facilitate wired or wireless communication between the electronic device 400 and other devices. The electronic device 400 may access a wireless network based on a communication standard, such as WIFI, 2G or 3G, or a combination thereof. In an example, the communication component 416 receives a broadcast signal or broadcast related information from an external broadcast management system via a broadcast channel. In an example, the communication component 416 may also include a Near Field Communication (NFC) module to facilitate short-range communications. For example, the NFC module may be implemented based on Radio Frequency Identification (RFID) technology, Infrared Data Association (IrDA) technology, Ultra-Wide Band (UWB) technology, Bluetooth (BT) technology and other technology.

In an example, the electronic device 400 may be implemented by one or more of an Application Specific Integrated Circuit (ASIC), a Digital Signal Processor (DSP), a Digital Signal Processor (DSPD), a Programmable Logic Device (PLD), a Field Programmable Gate Array (FPGA), a controller, a microcontroller, a microprocessor or other electronic components.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

After considering the description and practicing the present disclosure, those skilled in the prior art may easily conceive of other implementations of the present disclosure. The present disclosure is intended to encompass any variations, uses and adaptive changes of the present disclosure. These variations, uses and adaptive changes follow the general principle of the present disclosure and include common knowledge or conventional technical means in the prior art not disclosed in the present disclosure. The description and examples herein are intended to be illustrative only and the real scope and spirit of the present disclosure are indicated by the claims of the present disclosure.

It shall be appreciated that the present disclosure is not limited to the precise structures described above and shown in the accompanying drawings and may be modified or changed without departing from the scope of the present disclosure.

The foregoing descriptions are merely part of examples of the present disclosure and not intended to limit the present disclosure. Any modifications, equivalent substitutions, adaptations made within the scope of the present disclosure shall be encompassed in the scope of protection the present disclosure.

What is claimed is:

1. A method of recognizing a biological feature, applied to a biological feature recognizing circuit of an electronic device, the method comprising:

obtaining first biological feature data by a biological feature recognition process;

performing a first recognition operation according to the first biological feature data and biological feature template data to obtain a first recognition result; and when the biological feature recognizing circuit determines that the first recognition result indicates a match failure:
obtaining second biological feature data by the biological feature recognition process, wherein the second biological feature data and the first biological feature data are collected by a same biological feature collector at different moments in a same biological feature recognition process;
performing a re-recognition operation according to the second biological feature data and the biological feature template data to obtain a second recognition result, wherein the first recognition operation and the re-recognition operation are performed in a same process;
when the biological feature recognizing circuit determines that the second recognition result indicates a successful match or a number of re-recognition operations reaches a preset upper limit, outputting the second recognition result; and
when the biological feature recognizing circuit determines that the second recognition result indicates a match failure and the number of the re-recognition operations is less than the preset upper limit, obtaining new second biological feature data and performing the re-recognition operation.

2. The method of claim 1, wherein the preset upper limit is set to be one.

3. The method of claim 1, wherein obtaining the first biological feature data comprises:
obtaining the first biological feature data by the biological feature collector when it is determined that a biological feature recognition operation is triggered and a number of the match failure is less than a preset maximum number of the match failure.

4. The method of claim 1, further comprising:
collecting the second biological feature data by the biological feature collector when it is determined that a recognition result indicates the match failure, wherein the recognition result comprises the first recognition result and the second recognition result.

5. The method of claim 1, further comprising:
determining a sampling frequency based on a time length for each of the re-recognition operations; and
collecting biological feature data as the first biological feature data and the second biological feature data at the sampling frequency by the biological feature collector in the same biological feature recognition process.

6. The method of claim 1, further comprising:
outputting the first recognition result when the first recognition result indicates a successful match.

7. The method of claim 1, wherein the biological feature data comprises at least one of: fingerprint data, human face data, iris data, and voice data.

8. The method of claim 1, wherein outputting the second recognition result comprises:
triggering a biological feature recognition operation, wherein the biological feature recognition operation comprises at least one of: an unlocking operation and a payment operation.

9. An electronic device, comprising:
a biological feature recognizing circuit; and
a non-transitory machine-readable storage medium configured to store machine-executable instructions;
wherein, by reading and executing the machine-executable instructions, the biological feature recognizing circuit is caused to:
obtain first biological feature data by a biological feature recognition process;
perform a first recognition operation according to the first biological feature data and biological feature template data to obtain a first recognition result; and
when the biological feature recognizing circuit the first recognition result indicates a match failure:
obtain second biological feature data by the biological feature recognition process, wherein the second biological feature data and the first biological feature data are collected by a same biological feature collector at different moments in a same biological feature recognition process;
perform a re-recognition operation according to the second biological feature data and the biological feature template data to obtain a second recognition result, wherein the first recognition operation and the re-recognition operation are performed in a same process;
when the biological feature recognizing circuit determines that the second recognition result indicates a successful match or a number of re-recognition operations reaches a preset upper limit, outputting the second recognition result; and
when the biological feature recognizing circuit determines that the second recognition result indicates a match failure and the number of the re-recognition operations is less than the preset upper limit, obtaining new second biological feature data and performing the re-recognition operation.

10. The electronic device of claim 9, wherein the preset upper limit is set to be one.

11. The electronic device of claim 9, wherein, when the first biological feature data are obtained, the biological feature recognizing circuit is caused to:
obtain the first biological feature data by the biological feature collector when it is determined that a biological feature recognition operation is triggered and a number the match failure is less than a preset maximum number of the match failure.

12. The electronic device of claim 9, wherein the biological feature recognizing circuit is caused to:
collect the second biological feature data by the biological feature collector when it is determined that a recognition result indicates the match failure, wherein the recognition result comprises the first recognition result and the second recognition result.

13. The electronic device of claim 9, wherein the biological feature recognizing circuit is caused to:
determine a sampling frequency based on a time length for each of the re-recognition operations; and
collect biological feature data as the first biological feature data and the second biological feature data at the sampling frequency by the biological feature collector in the same biological feature recognition process.

14. The electronic device of claim 9, wherein the biological feature recognizing circuit is caused to:
output the first recognition result when the first recognition result indicates a successful match.

15. The electronic device of claim 9, wherein the biological feature data comprises at least one of: fingerprint data, human face data, iris data, and voice data.

16. The electronic device of claim 9, wherein, when the second recognition result is output, the biological feature recognizing circuit is caused to:
trigger a biological feature recognition operation, wherein the biological feature recognition operation comprises at least one of: an unlocking operation and a payment operation.

17. A non-transitory machine-readable storage medium storing machine-executable instructions executed by a biological feature recognizing circuit of an electronic device, wherein the machine-executable instructions, when executed, cause the biological feature recognizing circuit to perform:

obtaining first biological feature data by a biological feature recognition process;

performing a first recognition operation according to the first biological feature data and biological feature template data to obtain a first recognition result; and when the biological feature recognizing circuit the first recognition result indicates a match failure:

obtaining second biological feature data by the biological feature recognition process, wherein the second biological feature data and the first biological feature data are collected by a same biological feature collector at different moments in a same biological feature recognition process;

performing a re-recognition operation according to the second biological feature data and the biological feature template data to obtain a second recognition result, wherein the first recognition operation and the re-recognition operation are performed in a same process;

when the biological feature recognizing circuit determines that the second recognition result indicates a successful match or a number of re-recognition operations reaches a preset upper limit, outputting the second recognition result; and when the biological feature recognizing circuit determines that the second recognition result indicates a match failure and the number of the re-recognition operations is less than the preset upper limit, obtaining new second biological feature data and performing the re-recognition operation.

* * * * *